United States Patent [19]
Roussel et al.

[11] Patent Number: 5,342,640
[45] Date of Patent: Aug. 30, 1994

[54] PROCESS AND APPARATUS FOR PEELING FOOD PRODUCTS SUCH AS FISH, FRUITS OR VEGETABLES

[75] Inventors: Herve Roussel, Olonne-sur-Mer; Jean-Jacques Hermant, Cholet; Lionel Dalla-Serra, Heric, all of France

[73] Assignee: Protion Societe Anonyme, Angers Cedex, France

[21] Appl. No.: 30,115

[22] PCT Filed: Sep. 26, 1991

[86] PCT No.: PCT/FR91/00754
  § 371 Date: Mar. 18, 1993
  § 102(e) Date: Mar. 18, 1993

[87] PCT Pub. No.: WO92/05704
  PCT Pub. Date: Apr. 16, 1992

[30] Foreign Application Priority Data
  Sep. 28, 1990 [FR] France .................. 90/12026

[51] Int. Cl.⁵ .................. A23L 1/00; A23N 7/00
[52] U.S. Cl. .................. 426/479; 99/586; 426/483; 452/126; 452/131
[58] Field of Search .............. 426/479, 480, 482, 483; 452/126, 131; 99/586, 483; 406/146

[56] References Cited
U.S. PATENT DOCUMENTS

| | | | |
|---|---|---|---|
| 1,921,055 | 8/1933 | Vucassovich | 452/126 |
| 3,024,821 | 3/1962 | Bean | 99/586 |
| 3,276,496 | 10/1966 | Warren | 99/483 |
| 3,413,039 | 11/1968 | Asgeirsson | 406/146 |
| 3,546,738 | 12/1970 | Heck | 452/126 |
| 4,550,656 | 11/1985 | Kirk | 99/586 |
| 4,569,850 | 2/1986 | Harris et al. | 426/482 |
| 4,765,030 | 8/1988 | Dubowik | 452/126 |

FOREIGN PATENT DOCUMENTS

| | | |
|---|---|---|
| 894540 | 12/1944 | France . |
| 1560456 | 2/1969 | France . |
| 59-210877 | 11/1984 | Japan . |
| 792651 | 4/1958 | United Kingdom . |
| 2116829 | 10/1983 | United Kingdom . |
| 2160757 | 1/1986 | United Kingdom . |

Primary Examiner—George Yeung
Attorney, Agent, or Firm—Young & Thompson

[57] ABSTRACT

The invention relates to a method and device for peeling food such as fish, complete or not, for example sardines, herrings, anchovies, etc.; fruits such as peaches or vegetables such as tomatoes whose skin has been previously subjected to a surface treatment. The method according to the invention is characterized in that the food products are displaced inside a conduit (54) wherein circulates an air flow generated by compression or depression. Application to the food industry.

10 Claims, 1 Drawing Sheet

PROCESS AND APPARATUS FOR PEELING FOOD PRODUCTS SUCH AS FISH, FRUITS OR VEGETABLES

FIELD OF THE INVENTION

The present invention relates to a process for peeling food products such as fish, whole or not, for example sardines, herrings, anchovies, etc., fruits such as peaches, or vegetables such as tomatoes, as well as an apparatus for practicing the process.

BACKGROUND OF THE INVENTION

Peeling fish, and particularly sardines, is a delicate operation which is carried out most of the time on fish as fillets. The peeling carried out automatically or manually comprises the securement of the fish on a support and cutting the skin by means of cutting elements. These mechanical cutting devices have on the whole difficulties in adjusting the level of the blades, knives and conveyors, which gives rise to loss of quality and lower weight production of the peeled fillets by these processes.

Other processes, such as that described in GB-A-2 116 829, consist, after superficial heating of the skin of the fish, in immersing this latter in an aqueous medium and drying it by the aid of brushes constituted by rotating rollers. In GB-A-2 160 757, the brushing is replaced by pulverization by cold water jets under pressure.

A last process applied industrially today consists in putting the skin of the fish in contact with a surface of a refrigerated drum and separating the quick-frozen skin by means of a continuous ribbon knife.

All the processes and apparatus described above are applied to preferably large fish in the form of fillets and whose size must be relatively homogeneous to avoid qualitative and quantitative loses that are too great.

In the case of fruits such as peaches, it is known to effect a chemical pretreatment by immersion in dilute caustic soda to which are added wetting agents, at a temperature of the order of 90° C., then peeling by passage between abrasive rubber discs. This process, involving the use of chemical agents and a relatively high temperature, is very deleterious to the nature of the product obtained.

As to vegetables such as tomatoes, it is usual to use chemical and/or steam processes. There again, the peeled product obtained is generally degraded and the process is not suitable for the peeling of fragile food products.

There is also known, from JP-A-59.210877, a process for peeling tomatoes consisting in preheating the tomatoes and placing them in contact with a current of hot air while causing them to rotate. Such a process requires a large and expensive installation and is not applicable to flat and/or elongated objects such as fish fillets.

In certain particular cases such as chestnuts or onions, it is known to burn the skin and then remove it by blowing compressed air or by aspiration. Such a process is not of general application.

SUMMARY OF THE INVENTION

One of the objects of the present invention is therefore to provide an industrial peeling process applicable particularly to fish of small size and of variable dimensions, whether these latter are whole, cleaned, beheaded or prepared in the form of fillets, or to fruits or vegetables which are fragile and/or soft and of varying dimensions.

Another object of the invention is to provide a continuous or discontinuous apparatus for the practice of this process which does not injure the food product but on the contrary permits obtaining peeled products whose surface condition is remarkably good.

For this purpose, the invention relates to a process for peeling food products comprising a skin such as fish, whole or not, for example sardines, herrings, anchovies, etc., fruits such as peaches, or vegetables such as tomatoes, characterized in that the skin is subjected to a superficial treatment and the food products are displaced within a conduit in frictional contact with the internal wall of said conduit.

The invention also relates to an apparatus for practicing the process, characterized in that it comprises at least one guide means within which flow the food products to be peeled, the internal surface of said guide means having a coefficient of friction sufficient to separate the skin previously treated.

BRIEF DESCRIPTION OF THE DRAWINGS

Other characteristics and advantages of the invention will become apparent from a detailed reading of the description which follows with regard to the accompanying drawing, which description and drawing are of course given entirely by way of example.

DETAILED DESCRIPTION OF THE INVENTION

The example described refers to fish or fillets of fish but the process and the apparatus of the invention are applicable to other food products such as fruits or vegetables. According to FIGS. 1 and 2, to facilitate the peeling itself, the fish or fillets of fish to be peeled are first subjected to a thermal treatment which serves to melt the lipidic subcutaneous layer and to render fragile the skin. This superficial thermal treatment is effected in conventional manner by quenching or spraying with hot water. The time-temperature conditions are a function of the fish to be treated and the size of these latter. The treatments now practiced on sardines of medium size are for example two minutes at 60° C., ten seconds at 90° C. or two seconds at 100° C. Any other type of thermal treatment, such as for example spraying with a jet of steam, a hot gas or infrared radiation, can be used. Following the thermal treatment, the fish or fillet of fish is immediately introduced into a conduit 4 in the interior of which flows at least one air flux generated by compression or depression. By means of the flux or fluxes generated, the fish moves through the interior of the conduit. When it leaves this latter, it is entirely peeled. According to the configuration of the conduit, the peeling is effected by contact of the fish with the internal walls of the conduit or by displacement of air along the surface of the fish. Thus, if it is desired to promote peeling by contact, the conduit can have retention means for the skin such as for example channels or grooves or even brush systems disposed radially of the interior of the conduit, said conduit being adapted itself to be in flexible or rigid form. If it is desired on the contrary to effect removal of the skin by displacement of air along the surface of the body of the fish, the conduit is provided with different inlets permitting the simultaneous dispatch of several flows in various directions. There can thus be effected a conduit provided radially with openings permitting the introduction of air flows which complete the principal air flow longitudinally relative to the conduit. It is also possible to combine the skin removal means, by contact and by air displacement in the case of very specific applications.

As to the air flow itself, it can be generated by compression or depression by means of a blowing or sucking turbine or by a compressor.

At the outlet of the conduit, the fish is cleaned of the rest of the skin and recovered to be subjected to other treatments.

Figure 1:
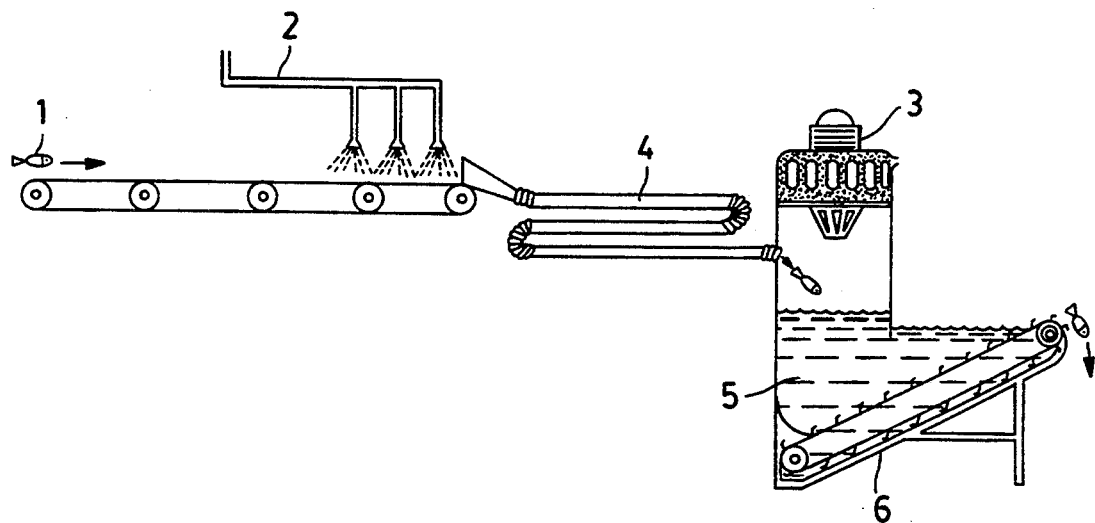
FIG. 1 shows a schematic view of a peeling apparatus including recovery means for peeled fish according to the object of the invention.

To practice this process, the apparatus comprises, for example, according to FIG. 1, a thermal treatment apparatus 2 constituted of conduits within which circulates steam which is projected against the fish 1 advancing on a conveyor belt. This thermal treatment is of short duration. It has no effect on the duration of preservation of the peeled product. At the output of the thermal treatment, the fish 1 is sucked within the conduit 4 and flows internally of the latter for 1 to 5 seconds to then be emptied into the receptacle 5 filled with ice water. The conduit may or may not have bends and its internal walls are smooth or provided with channelling or grooves, preferably radial, circular or helicoidal. The speed of movement of the fish through the conduit is variable and is preferably comprised between 0.5 and 50 m/s. This speed is a function of the fish, of the size of the conduit and of the force of suction or blowing. The diameter of the conduit is of the order of 0.1 to 20 cm. Air circulating within the conduit is produced by a conventional suction turbine 3 with which industrial vacuum systems are provided.

When the fish leaves the conduit, it is skinned. The major portion of the skin is separated by friction against the internal walls of the conduit. The fish and the fragments of fish emerge into a receptacle 5 containing cold water. This receptacle also permits the recovery of the lipidic fraction. The fish is recovered continuously thanks to a submerged conveyor system 6 and is then rinsed by water jet to eliminate the remaining fragments of skin. The rapid sequence of the stages permits the fish not to be affected by the thermal treatment. Moreover, immersion in an ice bath permits stopping very quickly the heat transfer.

Figure 2:
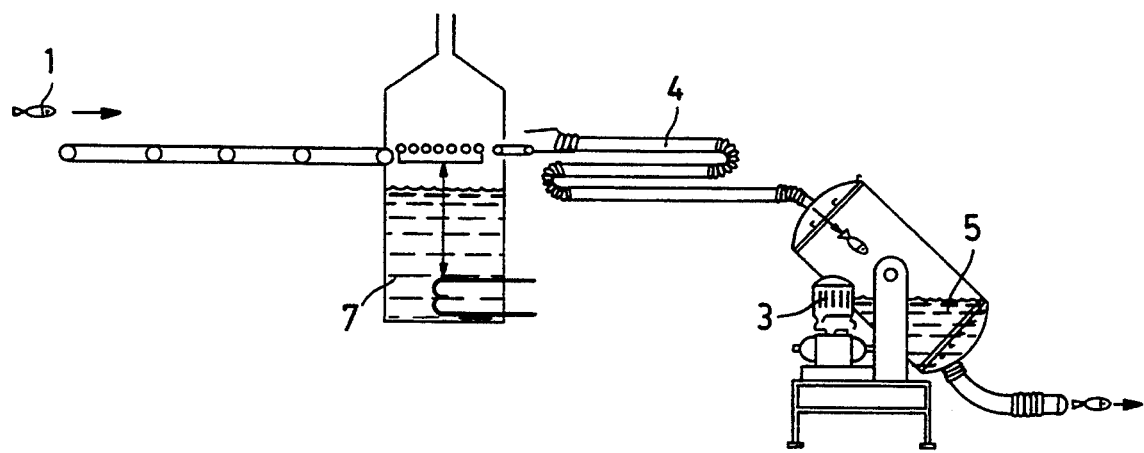
FIG. 2 shows a schematic view of another embodiment of recovery means for peeled fish included in the peeling apparatus according to the invention.

FIG. 2 shows another embodiment of the invention in which the thermal treatment is effected by immersion of the fish 1 in hot water 7 and the removal of the fish is effected manually by emptying the receptacle 5.

Obviously, the process and the apparatus described above, applicable to any type of fish or fillet of fish, can be so arranged as to work in series. It is thus possible to provide the apparatus with a large number of conduits 4.

It is evident that the invention is not limited to the embodiments set forth above but includes on the contrary all variations of embodiment. It is applicable in particular to other food products such as, for example, vegetables or fruits.

In the case of fruits such as peaches or vegetables such as tomatoes, the preliminary superficial treatment of the skin could be replaced or completed by a chemical treatment such as spraying or quenching with caustic soda.

In the case of heavy products such as tuna, it is difficult if not impossible to entrain the product by blowing or sucking air. In this case, the weight alone of the product can be used, such as an entire tuna, at the same time imparting to the conduit 4 a configuration of helicoidal type or comprising curved shapes, such that all of the skin will be successively in frictional contact with the internal wall of the conduit 4.

In the described example, the superficial treatment of the product is effected before movement through the conduit 4.

It is also possible to effect such a superficial treatment, in particular by heating, partially or totally in the conduit 4 which will then be provided in its initial portion with superficial treatment means, for example for heating or infrared, by spraying with hot water and/or steam and/or hot gas. There could be provided an increasing gradient of this superficial treatment, for example an increasing temperature.

We claim:

1. Process for peeling food products having a skin and selected from the group consisting of fish, fruits, and vegetables which comprises: subjecting the skin to a superficial treatment, displacing the food products in frictional contact with a rough wall, said rough wall being the internal wall of a conduit forming guide means for the product to be peeled, and generating an airflow by compression or depression within the interior of said conduit, whereby the skin of the food products is peeled.

2. Process for peeling according to claim 1, wherein air circulates within the conduit in a radial and axial direction.

3. Process for peeling according to claim 1, wherein air circulates within the conduit in a single direction.

4. Process for peeling according to claim 1, wherein the air flow is generated by means of a blowing or sucking turbine, or a compressor.

5. Process for peeling according to claim 1, wherein the independent of the food products is effected by gravity, said conduit being constructed and arranged to produce successively friction over all the skin.

6. Process for peeling according to claim 1, wherein the superficial treatment includes heating the skin by one of quenching, hot water spraying, steam spraying, hot gas spraying, and infrared radiation, said heating taking place before displacement through the conduit, or in an initial portion of said conduit.

7. Process for peeling according to claim 1, wherein the skin is first subjected to a chemical treatment.

8. Apparatus for peeling food products having a skin comprising: means for subjecting said skin to a preliminary treatment, and means for displacing said food products through the interior of at least one guide conduit, said guide conduit having an internal surface which has a coefficient of friction sufficient to separate the preliminarily treated skin.

9. Apparatus according to claim 8, wherein the internal surface of the guide conduit is provided with radial, circular or helicoidal grooves for retaining peeled skin.

10. Apparatus according to claim 8, further including recovery means for recovering peeled products, fragments of skin of said products, and lipidic fraction of said product, said recovery means comprising receptacles disposed at the outlet end of said guide conduit.

* * * * *